United States Patent
Yang

(10) Patent No.: US 8,103,251 B2
(45) Date of Patent: Jan. 24, 2012

(54) SYSTEM AND METHOD FOR MANAGING INFORMATION OF A COMMUNICATION DEVICE

(75) Inventor: Te-Yun Yang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 415 days.

(21) Appl. No.: 12/477,130

(22) Filed: Jun. 3, 2009

(65) Prior Publication Data

US 2010/0015954 A1  Jan. 21, 2010

(30) Foreign Application Priority Data

Jul. 18, 2008  (CN) .......................... 2008 1 0302788

(51) Int. Cl.
   *H04L 12/58* (2006.01)
   *H04M 3/16* (2006.01)

(52) U.S. Cl. ...................... 455/412.1; 455/411; 713/170

(58) Field of Classification Search ................. 455/558, 455/418, 415, 411; 713/193, 176, 194, 168, 713/155, 150, 189; 709/219, 204, 223, 248
See application file for complete search history.

(56) References Cited

U.S. PATENT DOCUMENTS

| | | | |
|---|---|---|---|
| 7,870,128 B2 * | 1/2011 | Jensen et al. | 707/727 |
| 2005/0003809 A1 * | 1/2005 | Kato | 455/415 |
| 2008/0275974 A1 * | 11/2008 | Rackiewicz | 709/223 |

* cited by examiner

*Primary Examiner* — Kiet Doan

(74) *Attorney, Agent, or Firm* — Altis Law Group, Inc.

(57) ABSTRACT

A system and method for managing information of a communication device include creating a user account, and allocating storage space to store an account profile of a user of the communication device and a contact list. The system and method further include determining if the account profile of the user has been updated, designating at least one contact in the contact list to receive the updated account profile, and sending the updated account profile of the user to the designated contact.

13 Claims, 4 Drawing Sheets

SYSTEM AND METHOD FOR MANAGING INFORMATION OF A COMMUNICATION DEVICE

BACKGROUND

1. Technical Field

Embodiments of the present disclosure relate to systems and methods for managing information, and more particularly to a system and method for managing information of a communication device.

2. Description of Related Art

Recently, multifunctional and large-volume communication devices have been developed. These communication devices have storage devices to store information, such as a contact list including names and phone numbers of contacts, mails, transmission/reception history, short messages, photographs, digital videos, and so on. In case that the communication devices are lost, the information stored in the communication devices is lost too. Since such information contains business information and account profile of users, lost of the information may result in many problems.

Moreover, when the users of the communication device update the account profile, they have to tell related contacts by sending notice messages or making phone calls to the related contacts manually. Such manual actions results in time consumption.

What is needed, therefore, is an improved system and method for managing information of a communication device.

DETAILED DESCRIPTION

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
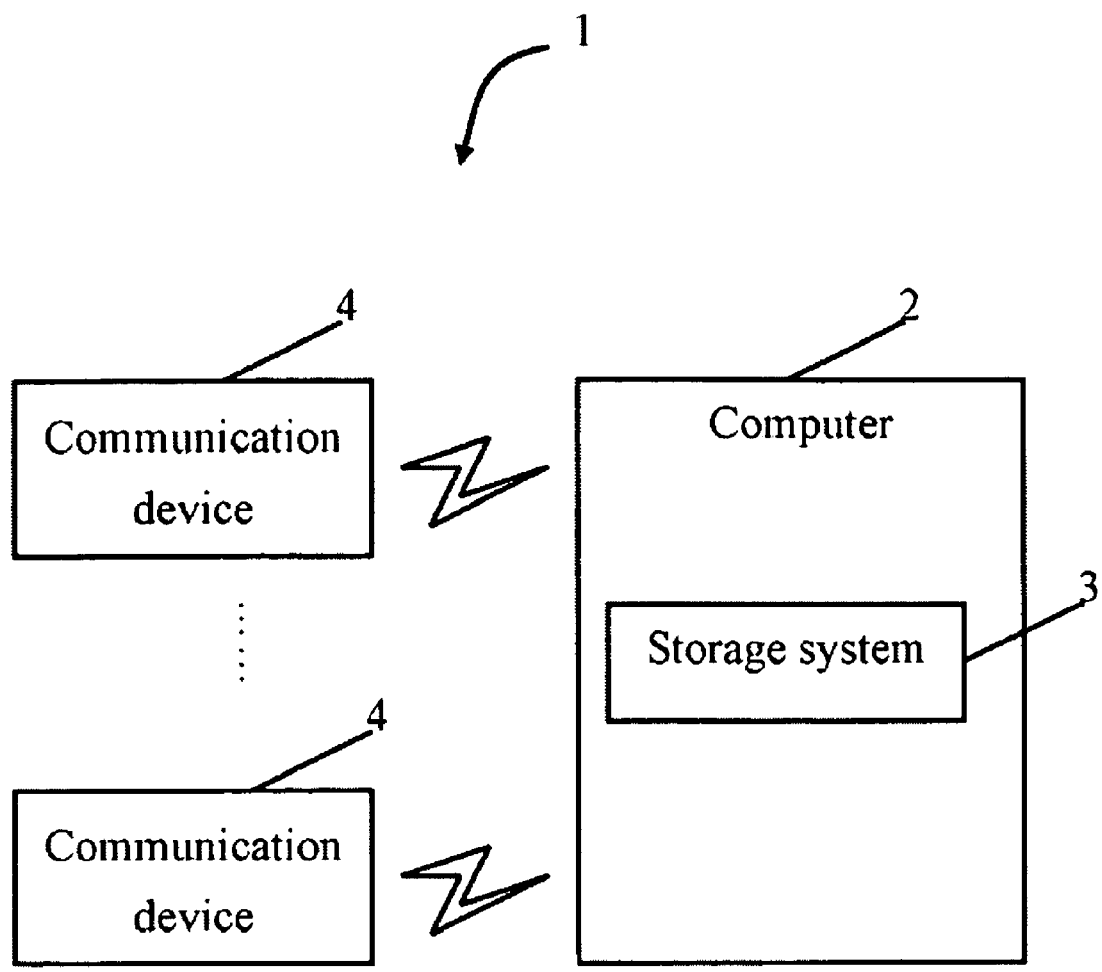
FIG. 1 is a block diagram of one embodiment of a system for managing information of a communication device.

FIG. 1 is a block diagram of one embodiment of a system 1 for managing information of a communication device 4 (hereinafter referred to as "the managing system 1"). The managing system 1 may include a plurality of communication devices 4 and a computer 2. The plurality of communication devices 4 may communicate with the computer 2 through a communication network (not shown in FIG. 1). Depending on the embodiment, the communication network may be the Global System for Mobile communication (GSM) network, the General Packet Radio Service (GPRS) network, or the Internet, for example. In one embodiment, the plurality of communication devices 4 may be mobile phones, personal digital assistants (PDAs), or other kinds of computing devices.

In one embodiment, the computer 2 may be a host computer or a server, for example. In one embodiment, the computer 2 may be a web server, which provides a website including various webpage for people to register, browse, upload/download, or manage information transmitted from the communication device 4, etc. The computer 2 includes a storage system 3, which stores one or more programs, such as programs of an operating system, and other applications of the computer 2, and various kinds of data, such as an account profile and contact lists of users of the plurality of communication device 4, etc. In one embodiment, the storage system 3 may include a hard disk of the computer 2.

Figure 2:
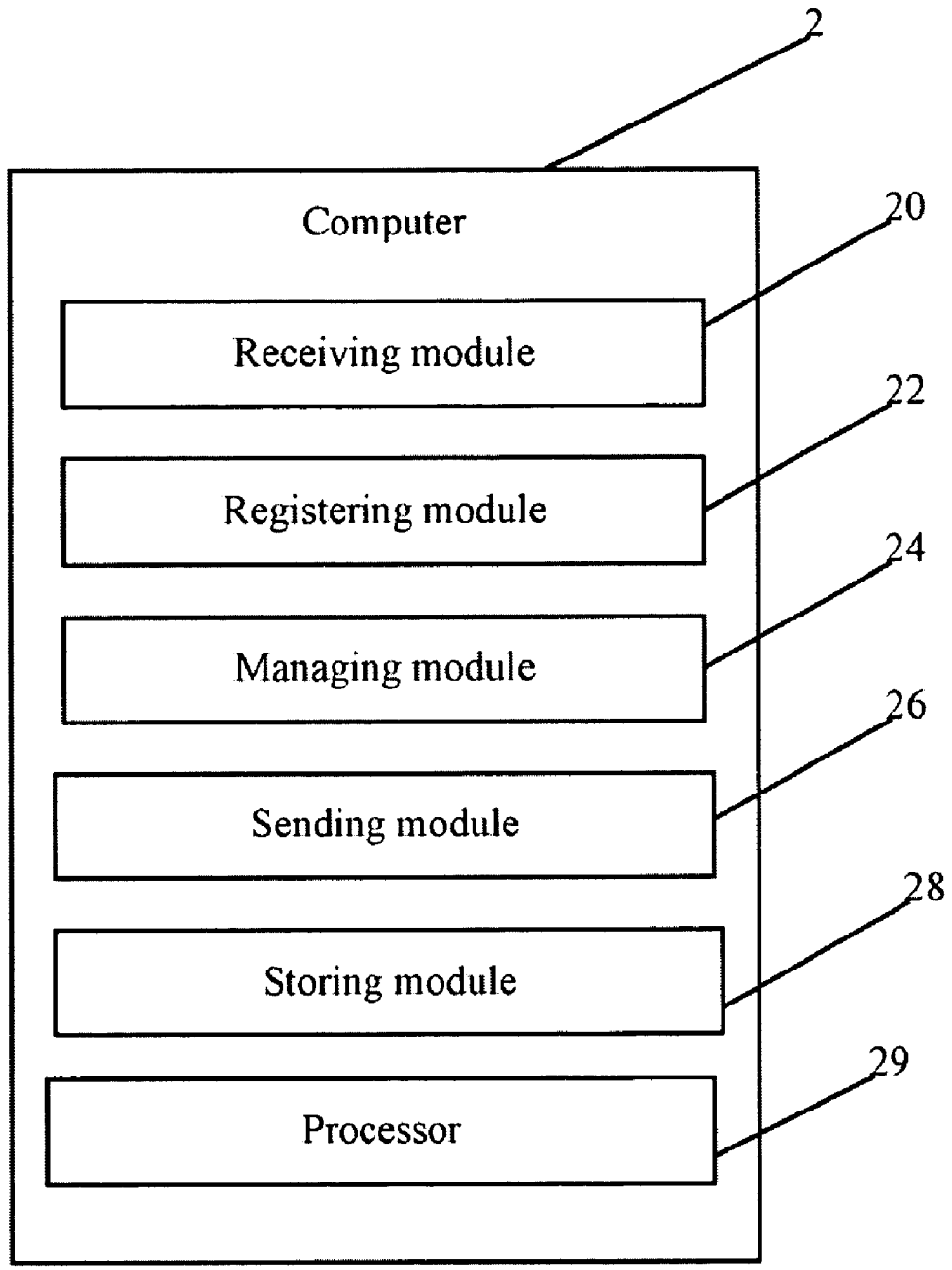
FIG. 2 is a block diagram of one embodiment of a computer.

FIG. 2 is a block diagram of one embodiment of the computer 2. In one embodiment, the computer 2 includes a receiving module 20, a registering module 22, a managing module 24, a sending module 26, a storing module 28, and a processor 29. The modules 20, 22, 24, 26 and 28 may be used to execute one or more operations of the computer 2, such as to manage the account profile of the user of the communication device 4. The processor 29 executes one or more computerized operations of the computer 2 and the other applications, to provide functions of the computer 2.

The computer 2 provides a register webpage for the user to register in the website. The receiving module 20 receives an account profile of the user from the communication device 4. In one embodiment, the account profile may include a login username, a user name, a password, an E-mail address, phone numbers, and so on. In one embodiment, the login username may be "hank007," and the user name may be "Hank Lee."

The registering module 22 creates a user account in the managing system 1 according to the account profile of the user, assigns an identification code, the identification code and the login username being used to validate a login attempt. The identification code may include one or more alphanumeric characters and/or symbols. The registering module 22 also allocates storage space in the storage system 3 for the user account. In one embodiment, the storage space may store various kinds of data transmitted from the communication device 4.

The managing module 24 receives a contact list and communication data from the communication device 4, and stores the contact list and the communication data in the storage space. In one embodiment, the contact list may include names, phone numbers, fax numbers, and/or E-mail addresses of a plurality of contacts, and the communication data may include communication records of the communication device 4, messages, etc. Depending on the embodiment, the communication device 4 may transmit the contact list and the communication data into the storage space through the Internet, or send the contact list by using electronic business cards (vCards) or E-mails through the GSM network or the GPRS network, etc. The vCard is an electronic (or virtual) business card, and contains a name, address information, phone numbers, uniform resource locators (URLs), logos, photographs, and even audio clips. The vCard may be attached to an e-mail message, or exchanged in other ways, such as on the World Wide Web.

The managing module 24 manages the contact list by classifying the contacts in the contact list into a plurality of groups, and ranks the plurality of groups according to a priority and/or a degree of importance of each group, etc. In one embodiment, the plurality of groups may include a family group, a friend group, a colleague group, etc. The plurality of groups may be ranked according to different degrees of importance. For example, the plurality of groups may be ranked according to an important rank, a middle important rank, an ordinary rank, etc. In one embodiment, the family group may be ranked to the important rank. When the account profile of the user has been updated, the contacts in the important rank may be designated to receive the updated account profile. The storing module 28 stores management data of the managing module 24 into the storage space.

The managing module 24 also updates the account profile of the user, the contact list, and the communication data by receiving updated data from the communication device 4. The storing module 28 stores the updated account profile, the contact list, and/or the communication data in the storage system 3.

In one embodiment, the communication device 4 transmits the login username, the identification code, and a vCard to the computer 2. The managing module 24 validates a user login according to the login username and the identification code, and determines if contents in the received vCard are the same as the account profile in the storage system 3. If the contents in the received vCard are different from the account profile in the storage system 3, the managing module 24 updates the account profile in the storage system 3 according to the contents of the received vCard. In another embodiment, the communication device 4 may transmit the login username, the identification code, and a vCard including updated information of contacts in the contact list to the computer 2 so as to update the contact list stored in the storage system 3. In another embodiment, the user may access the managing system 1 through the Internet and update the account profile of the user, the contact list, the communication data stored in the storage system 3 directly.

The managing module 24 further determines if the updated account profile of the user needs to be sent to each contact in the contact list, and designates at least one contact in the contact list to receive the updated account profile if the updated account profile of the user does not need to be sent to each contact in the contact list.

The sending module 26 sends the updated account profile to the at least one designated contact, or sends the updated account profile to each contact in the contact list if the updated account profile of the user needs to be sent to each contact in the contact list.

In another embodiment, the managing module 24 further grants access privileges to one or more contacts in the contact list to query/read the account profile of the user, and the sending module 26 sends a notice message including the login username of the user to the one or more granted contacts having access privilege. In one embodiment, the notice message may be a text message, or a multimedia messaging service (MMS) message, etc.

If any granted contact wants to query/read the account profile of the user, a query message including the login username may be sent to the computer 2 from the granted contact. The managing module 24 receives the login username from the granted contact, and the sending module 26 sends the account profile of the user to the granted contact.

Figure 3:
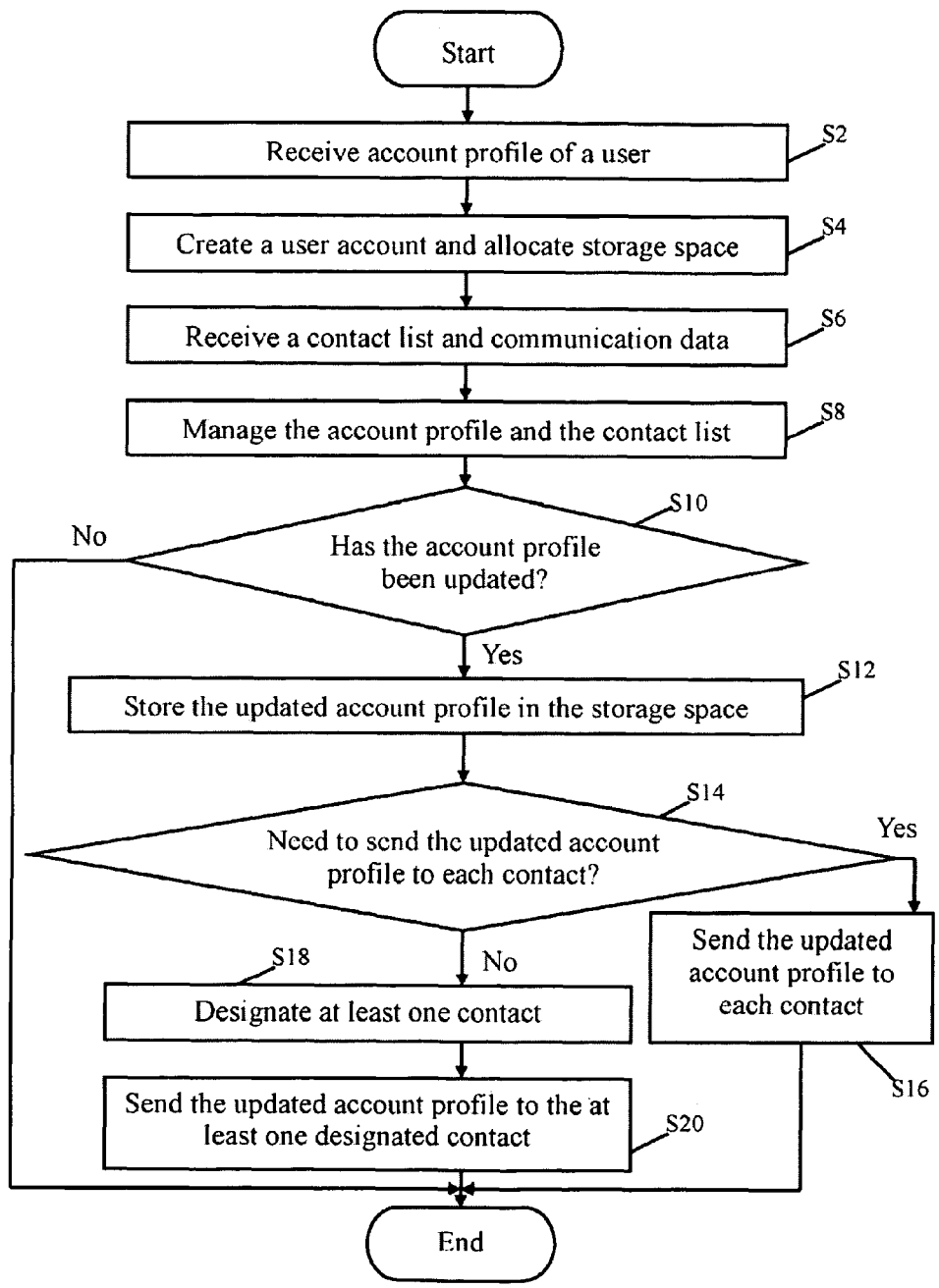
FIG. 3 is a flowchart of one embodiment of a method for managing information of the communication device.

FIG. 3 is a flowchart of one embodiment of a method for managing information of a communication device 4. Depending on the embodiment, additional blocks may be added, others removed, and the ordering of the blocks may be replaced.

In block S2, the receiving module 20 receives an account profile of the user transmitted from the communication device 4. In one embodiment, the account profile may include a login username, a user name, a password, an E-mail address, phone numbers, and so on.

In block S4, the registering module 22 creates a user account in the managing system 1 according to the account profile of the user, assigns an identification code, and allocates storage space in the storage system 3 for the user account. In one embodiment, the login username and the identification code are used to validate a login attempt, and the storage space may store various kinds of data transmitted from the communication device 4.

In block S6, the managing module 24 receives a contact list and communication data from the communication device 4, stores the contact list and the communication data in the storage space. In one embodiment, the contact list may include names, phone numbers, fax numbers, and/or E-mail addresses of a plurality of contacts, and the communication data may include communication records of the communication device 4, messages, etc.

In block S8, the managing module 24 manages the contact list by classifying the contacts in the contact list into a plurality of groups, and ranks the plurality of groups according to a priority and/or a degree of importance of each group, etc, and the storing module 28 stores management data of the managing module 24 into the storage space. As mentioned above, the plurality of groups may include a family group, a friend group, a colleague group, etc. The plurality of groups may be ranked according to different degrees of importance. For example, the plurality of groups may be ranked according to an important rank, a middle important rank, an ordinary rank, etc.

In block S10, the managing module 24 determines if the account profile of the user has been updated. If the account profile of the user has been updated, in block S12, the storing module 28 stores the updated account profile into the storage space. Otherwise, if the account profile of the user has not been updated, the procedure ends.

In block S14, the managing module 24 determines if the updated account profile of the user needs to be sent to each contact in the contact list. If the updated account profile of the user needs to be sent to each contact in the contact list, in block S16, the sending module 26 sends the updated account profile to each contact in the contact list.

If the updated account profile of the user does not need to be sent to each contact in the contact list, in block S18, the managing module 24 designates at least one contact in the contact list to receive the updated account profile.

In block S20, the sending module 26 sends the updated account profile to the at least one designated contact.

Figure 4:
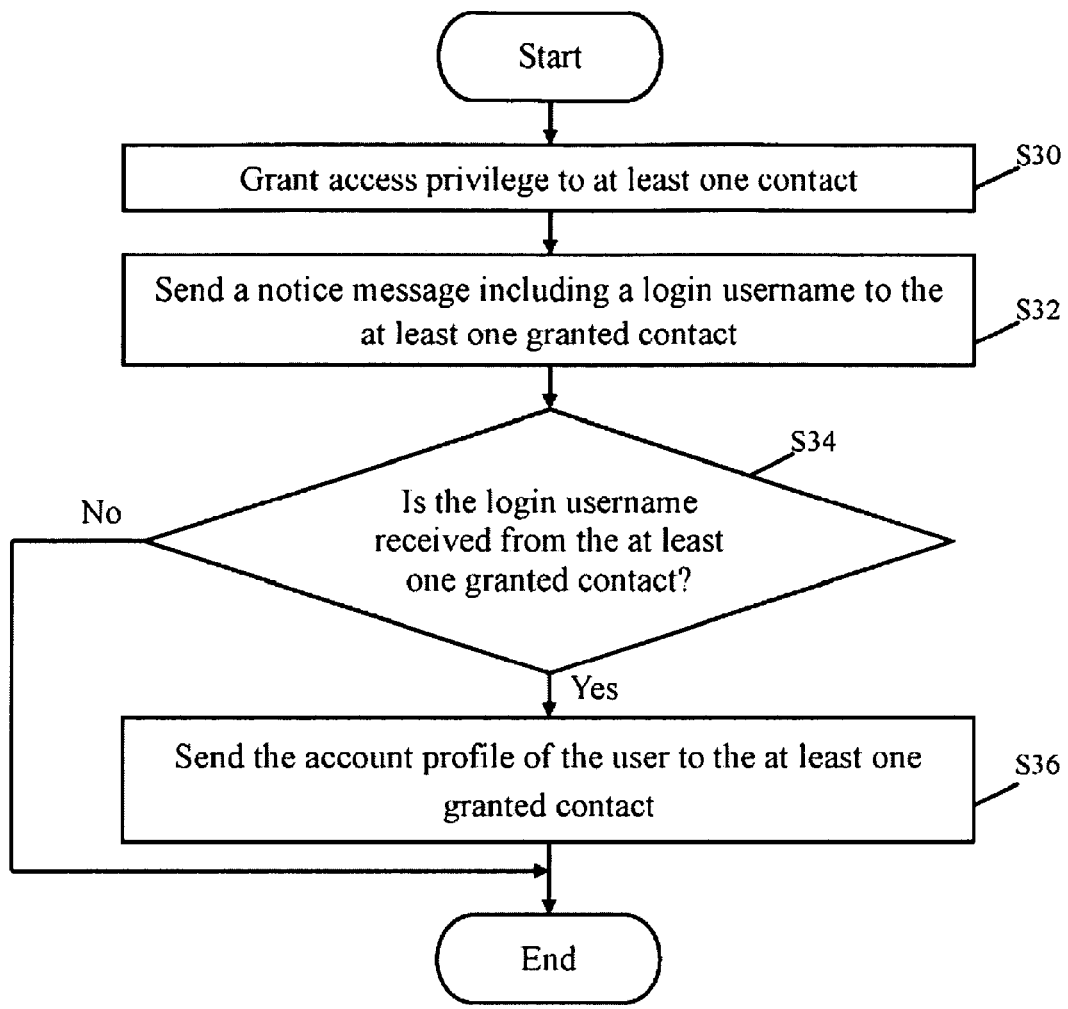
FIG. 4 is a flowchart of one embodiment of a method for granting access privileges to contacts.

FIG. 4 is a flowchart of one embodiment of a method for granting access privileges to contacts. Depending on the embodiment, additional blocks may be added, others removed, and the ordering of the blocks may be replaced.

In block S30, the managing module 24 grants access privileges to one or more contacts in the contact list to query/read the account profile of the user.

In block S32, the sending module 26 sends a notice message including the login username of the user to the one or more granted contacts having access privilege.

In block S34, the managing module 24 determines if a query message including the login username of the user is received from at least one granted contact. If the managing module 24 receives a query message including the login username of the user from the at least one granted contact, in block S36, the sending module 26 sends the account profile of the user to the at least one granted contact. Otherwise, if the managing module 24 does not receive a query message including the login username of the user from any granted contacts, the procedure ends.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A non-transitory computer-implemented method for managing information of a communication device, the method comprising:
receiving an account profile of a user transmitted from the communication device, wherein the account profile of the user comprises a login username, a user name, a password, an E-mail address, and phone numbers;
creating a user account according to the account profile of the user;
allocating storage space for the user account in a storage system of the communication device;
receiving a contact list from the communication device, and storing the account profile and the contact list in the storage space;
determining if the account profile of the user needs to be sent to each contact in the contact list when the account profile has been updated;
designating at least one contact in the contact list to receive the updated account profile if the account profile of the user does not need to be sent to each contact in the contact list;
sending the updated account profile to the at least one designated contact;
granting access privileges to a contact in the contact list to query the account profile of the user;
sending a notice message including the login username of the user to the granted contact;
receiving a query message including the login username of the user from the granted contact; and
sending the account profile of the user to the granted contact.

2. The method according to claim 1, wherein the contact list comprises names, phone numbers, and/or E-mail addresses of a plurality of contacts.

3. The method according to claim 1, further comprising:
sending the updated account profile to each contact in the contact list if the account profile of the user needs to be sent to each contact in the contact list.

4. The method according to claim 1, further comprising:
classifying contacts in the contact list into a plurality of groups; and
ranking the plurality of groups according to a priority and/or a degree of importance of each group.

5. A non-transitory computer system for managing information of a communication device in communication with the computer system over a communication network, the computer system comprising:
a storage system;
at least one processor; and
one or more programs stored in the storage system and being executable by the at least one processor, the one or more programs comprising:
a receiving module operable to receive an account profile of a user transmitted from the communication device, wherein the account profile of the user comprises a login username, a user name, a password, an E-mail address, and phone numbers;
a registering module operable to creates a user account according to the account profile of the user, and allocate storage space in the storage system for the user;
a managing module operable to receive a contact list from the communication device, store the account profile and the contact list in the storage space, determine if the account profile of the user needs to be sent to each contact in the contact list when the account profile has been updated, and designate at least one contact in the contact list to receive the updated account profile if the account profile of the user does not need to be sent to each contact in the contact list;
a sending module operable to send the updated account profile to the at least one designated contact
the managing module further operable to grant access privileges to a contact in the contact list to query the account profile of the user;
the sending module further operable to send a notice message including the login username of the user to the granted contact;
the managing module further operable to receive a query message including the login username of the user from the granted contact; and
the sending module further operable to send the account profile of the user to the granted contact.

6. The non-transitory computer system according to claim 5, wherein the contact list comprises names, mobile phone numbers, and/or E-mail addresses of a plurality of contacts.

7. The non-transitory computer system according to claim 5, wherein the sending module is further operable to send the account profile to each contact in the contact list if the updated account profile of the user needs to be sent to each contact in the contact list.

8. The non-transitory computer system according to claim 5, wherein the managing module is further operable to classify contacts in the contact list into a plurality of groups, and rank the plurality of groups according to a priority and/or a degree of importance of each group.

9. The non-transitory computer system according to claim 5, wherein the registering module is further operable to assign an identification code to the user, the identification code and the login username being used to validate a login attempt.

10. A non-transitory storage medium storing a set of instructions, the set of instructions capable of being executed by a processor to perform a method of managing information of a communication device, the method comprising:
receiving an account profile of a user transmitted from the communication device, wherein the account profile of the user comprises a login username, a user name, a password, an E-mail address, and phone numbers;
creating a user account according to the account profile of the user;
allocating storage space for the user account in a storage system of the communication device;
receiving a contact list from the communication device, and storing the account profile and the contact list in the storage space;
determining if the account profile of the user needs to be sent to each contact in the contact list when the account profile has been updated;
designating at least one contact in the contact list to receive the updated account profile if the account profile of the user does not need to be sent to each contact in the contact list;
sending the updated account profile to the at least one designated contact
granting access privileges to a contact in the contact list to query the account profile of the user.
sending a notice message including the login username of the user to the granted contact;
receiving a query message including the login username of the user from the granted contact; and
sending the account profile of the user to the granted contact.

11. The non-transitory storage medium as claimed in claim 10, wherein the contact list comprises names, mobile phone numbers, and/or E-mail addresses of a plurality of contacts.

12. The non-transitory storage medium as claimed in claim 10, wherein the method further comprises:
sending the account profile to each contact in the contact list if the account profile of the user needs to be sent to each contact in the contact list.

13. The non-transitory storage medium as claimed in claim 10, wherein the method further comprises:
classifying contacts in the contact list into a plurality of groups; and
ranking the plurality of groups according to a priority and/or a degree of importance of each group.

* * * * *